United States Patent [19]
Stigsson et al.

[11] Patent Number: 5,814,189
[45] Date of Patent: Sep. 29, 1998

[54] METHOD FOR GASIFYING CELLULOSE SPENT LIQUOR TO PRODUCE SUPERHEATED STEAM AND GREEN LIQUOR OF LOW CARBONATE CONCENTRATION

[75] Inventors: Lars Stigsson, Bjarred; Nils Bernard, Taby, both of Sweden

[73] Assignee: Kvaerner Pulping AB, Karlstad, Sweden

[21] Appl. No.: 794,409

[22] Filed: Feb. 3, 1997

Related U.S. Application Data

[63] Continuation-in-part of Ser. No. 769,928, Dec. 9, 1996, abandoned, which is a continuation of Ser. No. 293,165, Aug. 19, 1994, abandoned, which is a continuation of Ser. No. 949,523, Nov. 25, 1992, abandoned.

[30] Foreign Application Priority Data

May 31, 1990 [SE] Sweden ................................. 9001957
May 31, 1991 [WO] WIPO ..................... PCT/SE91/00383

[51] Int. Cl.$^6$ .................................................. D21C 11/04
[52] U.S. Cl. ........................ 162/30.11; 162/30.1; 162/31
[58] Field of Search ................................ 162/30.1, 30.11, 162/31; 48/69, 111, 209; 261/DIG. 54; 422/172, 227, 207, 185; 423/235; 55/256, 257.5

[56] References Cited

U.S. PATENT DOCUMENTS

| | | |
|---|---|---|
| 4,465,496 | 8/1984 | Suggitt . |
| 4,605,423 | 8/1986 | Koog . |
| 4,778,483 | 10/1988 | Martin et al. . |
| 4,801,307 | 1/1989 | Muenger et al. ............................ 48/69 |
| 4,808,264 | 2/1989 | Kignell .................................... 162/30.1 |

FOREIGN PATENT DOCUMENTS

| | | |
|---|---|---|
| C 374028 | 2/1975 | Sweden . |
| A 1401333 | 7/1975 | United Kingdom . |
| A1 8908491 | 9/1989 | WIPO . |
| 93/02239 | 2/1993 | WIPO . |
| 94/20677 | 9/1994 | WIPO . |

*Primary Examiner*—Stanley S. Silverman
*Assistant Examiner*—Dean T. Nguyen
*Attorney, Agent, or Firm*—Farkas & Manelli; Jeffrey S. Melcher

[57] ABSTRACT

Provided is a novel process for the preparation of an aqueous solution of alkaline compounds from a generator gas, containing carbon monoxide, carbon dioxide, hydrogen and entrained alkaline compounds, which gas has been formed during partial combustion of cellulose spent liquors in a gas generator connected to a quench vessel. The process includes the steps of:

a) contacting said generator gas containing alkaline compounds with one or more aqueous cooling and dissolving liquids under conditions such that said generator gas is cooled to a predetermined temperature above the steam saturation temperature at a prevailing pressure in said quench vessel by evaporative cooling of said generator gas, wherein a gas comprising superheated steam is formed;

b) separating said alkaline compounds from said gas comprising superheated steam in a quench vessel to thereby form a gas comprising superheated steam and which is substantially-free of alkaline compounds; and c) dissolving said alkaline compounds in an aqueous liquid to form said aqueous solution of alkaline compounds.

Also provided is a novel apparatus suitable for practicing the process.

18 Claims, 1 Drawing Sheet

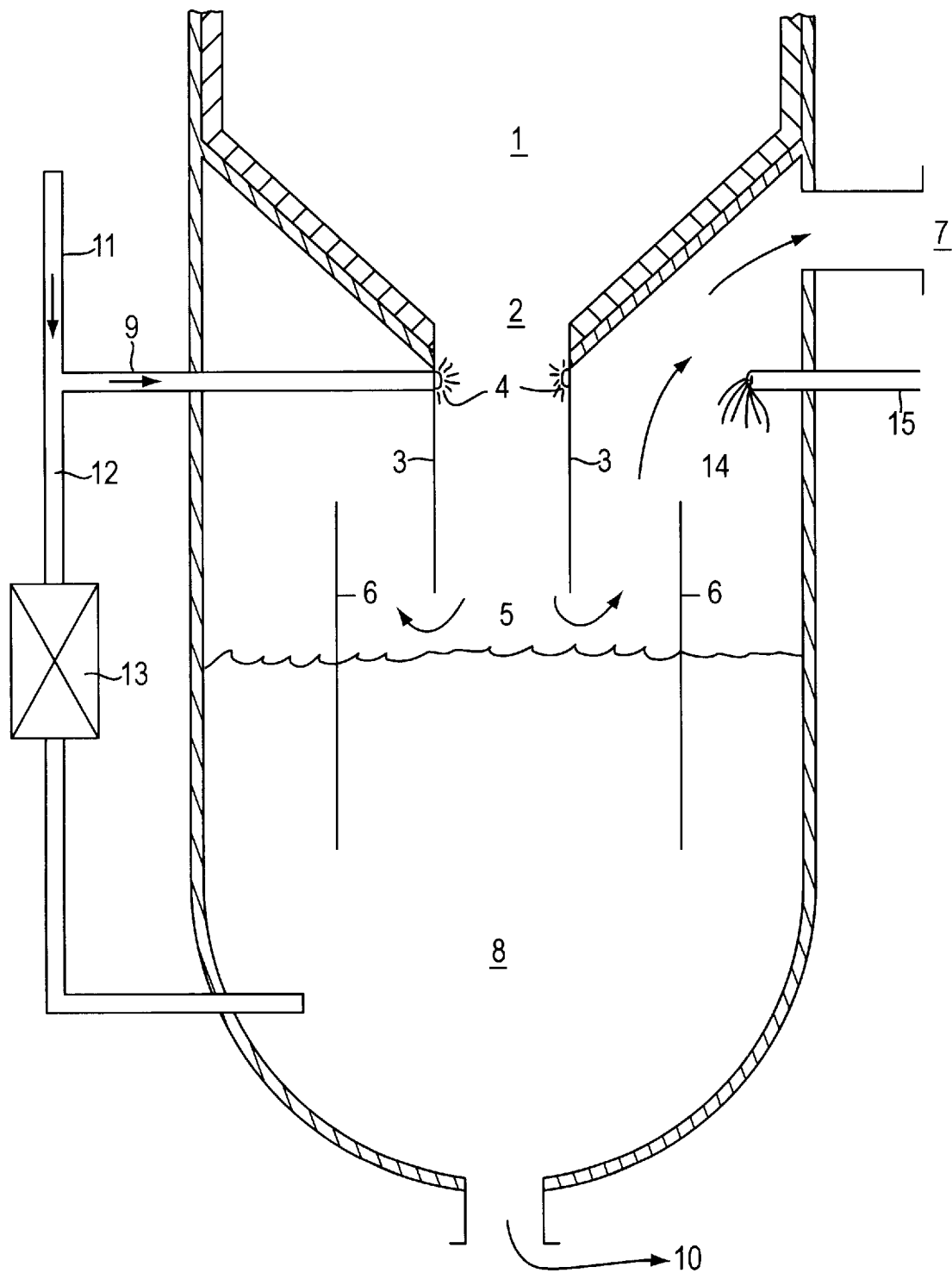

METHOD FOR GASIFYING CELLULOSE SPENT LIQUOR TO PRODUCE SUPERHEATED STEAM AND GREEN LIQUOR OF LOW CARBONATE CONCENTRATION

This application is a Continuation-in-Part of U.S. patent application No. 08/769,928, (now abandoned), filed Dec. 9, 1996 which is a Continuation of U.S. patent application Ser. No. 08/293,165, filed on Aug. 19, 1994 (now abandoned), which is a Continuation Application of U.S. patent application No. 07/949,523, filed on Nov. 25, 1992 (now abandoned).

DESCRIPTION OF THE INVENTION

1. Technical field

The present invention relates to a process for the preparation of an aqueous solution of sodium compounds which have been formed during partial combustion of cellulose spent liquors in a gas generator. The invention also relates to an apparatus for practicing the method.

2. Background of the invention

In the kraft pulping process, lignin is separated from the wood matrix by digestion using a cooking liquor, the active components of which substantially consist of sodium hydroxide and sodium hydrogen sulphide. Besides the cellulose pulp, a spent liquor is generated during the delignification process. This spent liquor is usually called "black liquor" and contains recoverable chemicals and combustible carbonaceous compounds. Presently, these chemicals are normally recovered by combusting the black liquor in a recovery boiler, wherein the energy content of the carbonaceous compounds is converted into valuable steam.

In the bottom of the recovery boiler, the liquor is partially decomposed under reducing conditions. The sodium and sulphur compounds are reduced to form a melt substantially consisting of sodium carbonate and sodium sulphide. The carbonaceous compounds are partially combusted to form a combustible gas, containing carbon monoxide and hydrogen. This combustible gas is oxidized by adding secondary and tertiary air in the upper part of the recovery boiler.

The inorganic chemicals form a pool of melt in the bottom of the recovery furnace, from where it is discharged to a dissolving tank. The melt is dissolved in an aqueous liquid in the dissolving tank, normally arranged adjacent to the recovery boiler. The solution thus obtained will mainly contain sodium carbonate, sodium sulphide and sodium hydroxide, and is usually called "green liquor". Downstream of the recovery boiler, the green liquor is treated with quick lime to convert the alkali carbonate to alkali hydroxide in accordance with well known causticizing practice shown by way of the following reaction:

$$Na_2CO_3 + CaO + H_2O \rightarrow 2NaOH + CaCO_3$$

The sodium sulphide does not participate in the causticizing reaction. The resulting liquor, which mainly consists of the active digesting chemicals sodium hydroxide and sodium hydrogen sulphide, is usually called "white liquor". The calcium carbonate precipitate formed in the causticizing reaction is reburned in a lime kiln to recover the calcium oxide. During washing of precipitated calcium carbonate a diluted weak alkaline solution is obtained. This weak alkaline liquor and the white liquor have a similar chemical composition. However, the weak alkaline liquor usually has a considerably lower concentration of chemicals than the white liquor.

A typical green liquor used for the preparation of white liquor typically is composed of the following:

| | |
|---|---|
| sodium hydroxide, NaOH | 15–25 grams/liter |
| sodium sulphide, $Na_2S$ | 20–50 grams/liter |
| sodium carbonate, $Na_2CO_3$ | 90–105 grams/liter |
| sodium sulphate, $Na_2SO_4$ | 5–10 grams/liter |

(all compounds calculated as sodium hydroxide).

The white liquor used as cooking liquor, is typically composed of the following:

| | |
|---|---|
| sodium hydroxide, NaOH | 80–120 grams/liter |
| sodium sulphide, $Na_2S$ | 20–50 grams/liter |
| sodium carbonate, $Na_2CO_3$ | 10–30 grams/liter |
| sodium sulphate, $Na_2SO_4$ | 5–10 grams/liter |

(all compounds calculated as sodium hydroxide).

The concentration of chemical compounds present in the green liquor is typically between 150 and 200 g/l calculated as sodium hydroxide. Higher concentrations are undesirable due to precipitation of salts, and lower concentrations can undesirably dilute the cooking liquors and increase the load on the evaporators.

Another method to recover the cooking chemicals from chemical pulping processes is based on gasification or partial combustion of the spent liquor.

Partial combustion of cellulose spent liquor can take place in for example a gas generator of the type described in U.S. Pat. No. 4,808,264 (Kignell). According to the process disclosed in that patent, droplets of molten alkaline compounds and a hot combustible gas comprising carbon monoxide and hydrogen are formed. The gas and alkaline compounds are separated in a quench vessel, arranged below the gas generator. In a very general statement at column 4, lines 64–68, said patent discloses that the contact between the gas and the quench liquid can be accomplished in different ways, eg. by passing the gas through a dip-tube of a water-trap, by injecting the cooling liquid into the gas stream, or by a combination of these methods. There is no specific teaching as to how the dip-tube or injection should be arranged, and there is no information provided on the physical conditions in the quench system utilized.

During partial combustion of cellulose spent liquor at temperatures from 700° C. to 1400° C., the alkaline compounds are present in both solid, liquid and gaseous form. A fine aerosol of sodium, sodium oxides and sodium hydroxide is formed, if the pulping base is sodium hydroxide. The separation of these alkaline compounds from the gas is complicated partly by the tackiness of the molten compounds and partly by the difficulty of separating the fine aerosol. Furthermore, there is a risk of explosions when molten sodium salts are brought into direct contact with aqueous liquids. U.S. Pat. No. 4,808,264 does not specifically address these problems. Thus, there is a need for an improvement to the quench system disclosed in this patent in order to further reduce the problems associated with the tackiness of the molten compounds, separating the fine aerosol, and avoiding explosions.

While use of the gasifier system of U.S. Pat. No. 4,808,264 results in major advantages over recovery boiler systems, pulp mills may prefer to use a recovery boiler instead of the gasifier system because the gasifier system may result in a liquor having higher concentrations of sodium hydrogen carbonate and lower concentrations of sodium hydroxide when compared to the green liquor produced in a conventional recovery boiler. Thus, there is a need for an understanding of why the gasifier system may result in a liquor having a higher concentration of sodium hydrogen carbonate and a lower concentration of sodium hydroxide, and a solution thereto.

SUMMARY OF THE INVENTION

Besides formation of carbon dioxide from partial oxidation reactions in the gasifier, carbon dioxide can also be formed by the water gas reaction between carbon monoxide and steam during gasification of black liquor in the generator. It has now been found that carbon dioxide may react with the alkaline compounds present in the hot combustible process gas (hereinafter referred to as "hot gas") produced in the generator when the hot gas is cooled and quenched. This reaction between carbon dioxide and the alkaline compounds is believed to be the source of the problem of why the liquor produced in conventional quench vessels has such an undesirably high concentration of sodium hydrogen carbonate and a low concentration of sodium hydroxide. It is therefor a major objective of the present invention to provide a solution to this problem.

Another objective of the present invention is to improve the separation of the molten alkaline compounds from the hot gas generated in the gas generator, and to prepare an aqueous solution suitable for further processing into cooking liquor.

A further objective of the present invention is to substantially reduce the risk of explosions caused by sodium salts contacting an aqueous medium.

Surprisingly, the above and other objectives can be achieved by separating the alkaline compounds from the hot gas generated in the gas generator prior to cooling the hot gas to about the steam saturation temperature in a multi-step cooling apparatus and method.

Provided is a novel process for the preparation of an aqueous solution of alkaline compounds from a hot gas, containing carbon monoxide, carbon dioxide, hydrogen and entrained alkaline compounds, which gas has been formed during partial combustion of cellulose spent liquors in a gas generator. The process comprises the steps of:

a) contacting the hot gas containing alkaline compounds with one or more aqueous cooling and dissolving liquids under conditions such that said hot gas is cooled to a predetermined temperature above the steam saturation temperature at a prevailing pressure by evaporative cooling of the hot gas, wherein a gas containing superheated steam is formed;

b) separating said alkaline compounds from said gas containing superheated steam in a quench vessel to form a gas containing superheated steam and which is substantially-free of alkaline compounds; and c) dissolving said alkaline compounds in an aqueous dissolving liquid to form said aqueous solution of alkaline compounds.

The present invention also provides a novel quench vessel for preparing an aqueous solution of alkaline compounds from a hot gas, containing carbon monoxide, carbon dioxide, hydrogen and entrained alkaline compounds, which gas has been formed during partial combustion of cellulose spent liquors in a gas generator connected to said quench vessel. The novel quench vessel comprises:

a) means for contacting said hot gas containing alkaline compounds with one or more aqueous cooling and dissolving liquids under conditions such that said hot gas is cooled to a predetermined temperature above the steam saturation temperature at a prevailing pressure in the quench vessel by evaporative cooling of said hot gas, wherein a gas containing superheated steam is formed;

b) means for separating said alkaline compounds from said gas containing superheated steam in said quench vessel to thereby form a gas containing superheated steam and which is substantially-free of alkaline compounds; and c) means for contacting said alkaline-free gas containing superheated steam with one or more aqueous cooling and dissolving liquids in said quench vessel to cool said alkaline-free gas containing superheated steam to about the steam saturation temperature at the prevailing quench vessel pressure.

The present invention unexpectedly provides a green liquor from the quench vessel having a sodium compound concentration of from about 10 grams to about 200 grams per liter of green liquor, in combination with a low concentration of sodium hydrogen carbonate. In particular, the concentration of sodium hydrogen carbonate present in the green liquor can unexpectedly be reduced to below about 40 grams per liter, and even below 20 grams per liter using the present invention. In some instances, the concentration of sodium hydrogen carbonate can be even reduced to substantially zero.

BRIEF DESCRIPTION OF THE DRAWING

The drawing illustrates a cross-sectional view of a preferred gas generator and quench vessel having multi-step cooling according to the present invention.

DETAILED DESCRIPTION OF PREFERRED EMBODIMENTS

It has been found that the carbon dioxide formed during gasification system of U.S. Pat. No. 4,808,264 may react with the alkaline compounds formed during hot gas cooling and separation of the alkaline compounds. For example, substantial quantities of sodium hydrogen carbonate can be formed in the green liquor because of these reactions. For some applications, such reactions may be undesirable. The present invention provides a solution by minimizing the reactions between the hot gas and the alkaline compounds in the quench vessel.

These undesirable reactions can surprisingly be suppressed or even avoided by cooling the hot gas in two or more distinct stages with separation of the alkaline compounds before the hot gas containing superheated steam is cooled to about the steam saturation temperature at the prevailing pressure in the quench vessel. The first cooling stage can be conducted by bringing the hot gas into direct contact with a coolant to cool the gas containing entrained alkaline compounds to a predetermined temperature that is lower than the temperature of the hot gas in the generator but which is higher than the steam saturation temperature at the prevailing pressure in the quench vessel. Typical quench vessel pressures range from about 0.1 MPa to about 10 MPa and usually corresponds to the pressure in the gas generator. Preferably, the hot gas should be cooled to a predetermined temperature which enables the alkaline compounds to solidify to facilitate separation of the alkaline compounds from the gas. Alternatively, the hot gas can be cooled to a predetermined temperature such that the alkaline compounds conglomerate into liquid or solid, or semi liquid/ solid particles to facilitate separation of the alkaline compounds from the hot gas. When the hot gas is cooled by exposure to the coolant, steam is formed by the vaporization of the coolant. The steam in the hot gas becomes superheated and thus a gas containing superheated steam is formed.

It has been found that if the steam in the hot gas containing entrained alkaline compounds remains superheated after the first cooling stage, unexpected advantages can be achieved. By keeping the steam in the gas superheated, the reaction between carbon dioxide and alkaline compounds can be suppressed. An example of a suitable predetermined temperature has been found to be from about 650° C. to about 250° C., preferably from about 500° C. to about 250° C., and most preferably from about 400° C. to about 250° C.

The first cooling stage can be conducted in any suitable manner, as long as the aqueous cooling and dissolving liquid is brought into contact with the hot gas so that evaporative cooling of the hot gas can occur. For example, the aqueous cooling and dissolving liquid can be directly injected into the hot gas in a dip tube arrangement further described herein.

Subsequent to this first cooling stage, the inorganic alkaline compounds can be separated from the superheated gas, for example by gravity and/or inertia, to form a gas essentially free of inorganic compounds. Thereafter, the substantially alkaline-free gas containing superheated steam can be cooled in a second cooling stage to a temperature corresponding to about the steam saturation temperature at the prevailing pressure in the quench vessel. For example, suitable steam saturation temperatures may range from about 150° C. to about 250° C., preferably from about 180° C. to about 220° C.

In a subsequent cooling stage the gas may be cooled to a lower temperature, for example to a temperature below about 150° C. by direct or indirect heat exchange.

In a preferred embodiment, the hot gas and alkaline compounds are passed from the gas generator into a downcoming tube, arranged under the gas generator, in which tube a cooling and dissolving liquid is injected. This cooling and dissolving liquid can be used to cool the gas by evaporative cooling and can be used to simultaneously wet the inner surface of the downcoming tube to protect the surface of tube. As the cooling and dissolving liquid evaporates, it can absorb energy from the gas leaving the generator thereby reducing the temperature of the gas from the temperature in the generator to a predetermined temperature. Preferably, the addition of the cooling and dissolving liquid is controlled to ensure that the steam in the gas remains superheated in the gas after the first cooling step.

The cooling and dissolving liquid injected in this first cooling step can be added in the upper part of the downcoming tube, for example through slots or through orifices and/or nozzles. The amount of the cooling and dissolving liquid injected into the downcoming tube can be adjusted to provide the desired level of cooling. In general, if a lower predetermined temperature of the gas is desired, the amount of cooling and dissolving liquid injected into the downcoming tube can be increased.

The cooling and dissolving liquid can be any suitable aqueous medium. For example, the cooling and dissolving liquid injected into the downcoming tube can be alkaline liquors, condensates and/or effluents from the pulp mill, or water, or mixtures thereof. Preferably, the cooling and dissolving liquid is a condensate from a countercurrent cooling stage installed in the gas stream downstream of the quench vessel.

During passage through the downcoming tube, the molten alkaline compounds can be at least partially solidified as they pass entrained in the hot gas through the lower section of the downcoming tube. Alternatively, the gas can be allowed to pass out from the downcoming tube through one or more openings in the tube wall, wherein the alkaline compounds will fall to the lower section of the downcoming tube and be dissolved in the dissolving liquid pool.

The inorganic alkaline compounds is thus forced by gravity and/or inertia to contact or fall into a dissolving liquid pool present in the lower section of the quench. Preferably, the gas is forced to change direction by passing the gas through one or more holes in the downcoming tube or by changing direction at the exit of the downcoming tube to separate the solid and/or liquid inorganic alkaline compounds from the hot gas. Most preferably, the gas is forced to turn about 180° in direction to facilitate removal of solid and liquid alkaline compounds from the gas, such as shown in the attached drawing.

In this manner, the inorganic alkaline compounds are separated from the hot gas before the hot gas is cooled to about the steam saturation temperature of the gas at the prevailing pressure in the quench vessel. The first cooling step can be conducted in more than one step, as long as the inorganic alkaline compounds are separated from the hot gas prior to cooling the hot gas to about the steam saturation temperature at the prevailing quench vessel pressure. Preferably, the first cooling step is conducted in a dip-tube as described herein.

The gas containing superheated steam, now substantially free of alkaline compounds, can thereafter be cooled in a second cooling zone in or adjacent to the quench vessel to a temperature preferably corresponding to about the steam saturation temperature of the gas at the prevailing quench pressure. For example, a cooling and dissolving liquid can be injected into the gas. In particular, the gas can be passed through a shower of cooling and dissolving liquid(s) in the quench vessel to cool the gas to about the steam saturation temperature at the prevailing quench vessel pressure. This shower can be located near the gas outlet of the quench vessel and/or the shower can cover the gas outlet of the quench vessel. The gas can also be cooled in multiple steps. Alternatively, a water-trap arrangement can also be used for cooling in this step. If desired, this cooling step can be conducted outside of the quench vessel, for example, by injection of a coolant into the gas stream downstream of the quench vessel. However, this latter cooling step is preferably conducted inside of the quench vessel.

A major portion of the alkaline compounds, and to a great extent also the aerosols, are separated from the gas between the first and second cooling stages. Unexpectedly, this multi-stage cooling minimizes the reactions between carbon dioxide and the alkaline compounds.

To avoid problems associated with the tackiness of the inorganic alkaline compounds it was generally believed in the art that rapid cooling in one stage to the steam saturation temperature should be conducted. However, with use of the methods and apparatus described herein, problems associated with the tackiness of the inorganic alkaline compounds can be substantially avoided. Moreover, the present invention reduces the danger of explosions caused by the alkaline compounds contacting an aqueous medium.

In a subsequent cooling stage downstream of the quench vessel the hot gas may be further cooled, for example to a temperature below about 150° C. This cooling stage is preferably conducted by indirect heat exchange with boiler feed water to raise steam. In order to remove any carryover alkaline aerosols to downstream turbo machinery, this downstream cooling stage can be performed countercurrently with condensing water falling by gravity exerting a final gas wash.

In the present invention, a solution comprising dissolved inorganic alkaline compounds can be withdrawn from the quench vessel having a composition very similar to standard green liquor. Thus, the solution in the quench vessel of the present invention is herein referred to as "green liquor." The green liquor produced according to the present invention requires significantly less causticizing capacity than green liquors produced according to prior art processes and quench vessels.

The concentration of alkaline compounds in the green liquor withdrawn from the quench vessel may be adjusted by adding condensate or weak white liquor at different cooling positions in the quench. One essential important consideration is to ensure that the steam in the hot gas remains superheated before the actual separation of inorganics, in accordance with the description above.

For example, utilizing the present invention, unexpectedly a green liquor can be obtained from the quench vessel having a sodium compound concentration of from about 10 grams to about 200 grams per liter of green liquor, in combination with a low concentration of sodium hydrogen carbonate. In particular, the concentration of sodium hydrogen carbonate present in the green liquor can unexpectedly be reduced to below about 40 grams per liter, and even below 20 grams per liter. In some instances, the concentration of sodium hydrogen carbonate can be even reduced to substantially zero.

Furthermore, it is recognized that by utilizing the present invention, surprisingly a green liquor can be obtained from the quench vessel having a sodium compound concentration of from about 10 grams to about 200 grams per liter of green liquor, in combination with a high concentration of sodium hydroxide. In particular, the concentration of sodium hydroxide present in the green liquor may be as high as least about 20 grams per liter, preferably at least about 40 grams per liter.

The temperature of the green liquor being withdrawn from the quench vessel may be controlled as desired for the particular application. Examples of suitable temperatures of the green liquor to be withdrawn ranges from about 150° to about 250° C., more preferably from about 180° C. to about 220° C.

The tendency of green liquor chemicals to form deposits in the quench can be minimized by controlling the temperature and concentration of liquids added to the quench.

In some cases, the present invention can be practiced in mills with a combined recovery boiler/black liquor gasification system, and in such cases the green liquor may be diluted from the gasifier quench.

The following equilibrium reactions in the quench are of special importance for the composition of green liquor produced according to the present invention:

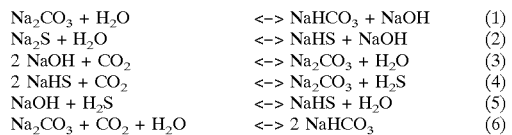

| | | |
|---|---|---|
| $Na_2CO_3 + H_2O$ | <-> $NaHCO_3 + NaOH$ | (1) |
| $Na_2S + H_2O$ | <-> $NaHS + NaOH$ | (2) |
| $2 NaOH + CO_2$ | <-> $Na_2CO_3 + H_2O$ | (3) |
| $2 NaHS + CO_2$ | <-> $Na_2CO_3 + H_2S$ | (4) |
| $NaOH + H_2S$ | <-> $NaHS + H_2O$ | (5) |
| $Na_2CO_3 + CO_2 + H_2O$ | <-> $2 NaHCO_3$ | (6) |

By contacting a hot gas containing carbon dioxide with an alkaline solution using standard quench vessels in accordance with the prior art, carbon dioxide tends to absorb into the solution and the resulting pH value of the green liquor is lowered.

In accordance with this reaction (6), alkali carbonate is partly converted to alkali hydrogen carbonate, which can be a highly undesirable compound in green liquor, because it requires an extra load on the causticizing system. Twice as much lime is required for conversion of alkali hydrogen carbonate to hydroxide, compared to a corresponding conversion from alkali carbonate.

Formation of sodium hydrogen carbonate in the quench system of the present invention can be minimized by cooling the hot gas in multiple stages in the quench and separating the inorganic alkaline compounds from the hot gas before the hot gas is cooled to about the steam saturation temperature at the prevailing quench vessel pressure.

The invention will be illustrated in more detail by using the cross-sectional view in the attached drawing. In the drawing, 1 denotes the reaction zone of the gas generator in which cellulose spent liquor is partially combusted at a temperature of about 700° C. to about 1400° C. and a pressure in the range of about 0.1 MPa to about 10 MPa.

The hot gas with its entrained droplets and aerosol of alkaline compounds is forced to pass through the throat 2 and down into the downcoming tube 3. At the entrance of the downcoming tube, an aqueous cooling and dissolving liquid is injected into the gas flow through nozzles 4 or through an annular slot. The surface of the upper section of the downcoming tube 3 is thereby coated with liquid to prevent incrustation. The gas is cooled by vaporization of the liquid to a predetermined temperature greater than the steam saturation temperature at the prevailing quench vessel pressure, such as about 250° C. or more, to provide a gas containing a superheated steam. The gas containing superheated steam is then forced to change direction and turn about 180° at the lower end of the downcoming tube, shown at 5, which end is preferably serrated in order to evenly distribute the gas flow around its circumference. The gas containing superheated steam then rises through the quench vessel, preferably through the optional upcoming tube 6 that is concentrically arranged around the downcoming tube. Optionally, the upcoming tube 6 can be the inner walls of the quench vessel.

The entrained inorganic alkaline compounds are forced by gravity and/or inertia to fall into the quench pool 8 in which the compounds are dissolved to form a green liquor. The gas containing superheated steam is contacted with a second cooling liquid in the shower shown at 14 before it leaves the quench vessel through one or more outlets 7 to cool the gas down to the steam saturation temperature at the prevailing quench vessel pressure. The level of the liquid in quench pool 8 can be controlled by the addition of cooling liquids in positions 9 and 15 and by the drafting of product green liquor 10 which contains the dissolved alkaline compounds.

For example, the flow of cooling liquid 9 may comprise two parts, a makeup flow 11 and a recirculating flow 12, which preferably is cooled in a heat exchanger 13.

The present invention is suitable for use in pulp mills utilizing a gasification system for recovery of energy and chemicals from a spent liquor. The present invention includes an improved pulp mill comprising a gas generator and a novel quench vessel that provide enhanced efficiency in the recovery of alkaline compounds.

The terms and expressions which have been employed herein are used as terms of description and not limitation, and there is no intention in the use of such terms and expressions of excluding any equivalents of the features shown and described or portions thereof, but it is recognized that various modifications are possible within the scope of the invention claimed.

The following Comparative Example A describes the composition of a typical green liquor produced in a pulp mill using a standard recovery boiler.

Comparative Example B represents a summary of experimental data using a pilot scale gasifier and quench vessel system as described in U.S. Pat. No. 4,808,264.

Example 1 represents a summary of experiments using a pilot scale gasifier and quench vessel system according to the present invention.

COMPARATIVE EXAMPLE A

A typical standard green liquor recovered from firing black liquor in a conventional recovery boiler system has the following composition:

| | | |
|---|---|---|
| $Na_2CO_3$ | 87 | g/liter as NaOH |
| $NaHCO_3$ | 0 | g/liter as NaOH |
| NaHS | 28 | g/liter as NaOH |
| NaOH | 45 | g/liter |

COMPARATIVE EXAMPLE B

A black liquor gasification system of the type described in U.S. Pat. No. 4,808,264 was installed in a kraft pulp mill for recovery of chemicals and energy from black liquor.

A black liquor with a composition corresponding to the black liquor used in Comparative Example A was used as feedstock for the gasifier. Prior to injection into the gasifier, the black liquor was concentrated to about 72% dry solids content in a five effect evaporation plant. The liquor was preheated to about 150° C. and introduced into the reactor together with an oxygen containing gas through a burner arrangement.

In the reactor, the liquor was being subjected to partial oxidation while forming CO, $CO_2$, $H_2$, $H_2S$ and smelt comprising $Na_2CO_3$ and $Na_2S$. The reactor temperature was 950° C. and the pressure was 3.1 Mpa.

The hot combustible gas generated in the gasifier along with its content of molten alkaline compounds was rapidly cooled to a temperature of about 190° C. in a water-trap quench to form a quench liquid and a cooled saturated synthesis gas.

The quench liquid (green liquor) was transferred to the mill causticizing area for conversion to white liquor in accordance with normal practice in a kraft mill.

Quenching the hot gas in one stage and simultaneously dissolving the molten inorganics resulted in formation of a green liquor having a low alkalinity. The composition of the green liquor in this prior art quenching mode was:

| | | |
|---|---|---|
| $Na_2CO_3$ | 108 | g/liter as NaOH |
| $NaHCO_3$ | 40 | g/liter as NaOH |
| NaHS | 12 | g/liter as NaOH |
| NaOH | 0 | g/liter |

The green liquor of Comparative Example B having a low alkalinity will cause a significantly higher load on the causticizing and lime kiln operations in a kraft mill, than the standard green liquor produced in Comparative Example A. The sodium bicarbonate must be causticized to form sodium carbonate in a first stage, and the hydrogen sulfide in the hot gas needs to be converted to active sulfur chemicals in the cooking liquor.

The extra causticizing demand for the gasification route in Comparative Example B is about 120%, compared to Comparative Example A.

EXAMPLE 1

Redesigning the above quench apparatus of Comparative Example B in accordance with the present invention and practicing multi-stage cooling and removal of the inorganic alkaline compounds from the hot gas prior to cooling the gas to about the steam saturation temperature at the prevailing quench vessel pressure prevents undesirable quench reactions and formation of sodium hydrogen carbonate, and substantially increases the amount of sodium hydroxide retained in the green liquor.

In the first cooling stage, the temperature of the hot gas was allowed to drop from 950° C. to a predetermined temperature of about 300° C. by evaporative cooling of the hot generator gas to form a gas containing superheated steam. The inorganic alkaline compounds were then separated from the gas containing superheated steam. In a second cooling stage, the gas containing superheated steam was cooled to a temperature of about 190° C., corresponding to the steam saturation temperature at the prevailing quench vessel pressure.

The green liquor composition from a two-stage quench designed in accordance with the present invention was:

| | | |
|---|---|---|
| $Na_2CO_3$ | 105 | g/liter as NaOH |
| $NaHCO_3$ | 0 | g/liter as NaOH |
| NaHS | 15 | g/liter as NaOH |
| NaOH | 40 | g/liter |

The composition of the green liquor produced is very similar to the recovery boiler green liquor of Comparative Example A and the extra load on causticizing to form white liquor is only 5%. This is a remarkable improvement of about 115% (120–5) over Comparative Example B.

Thus, it is of great importance to design cooling quench systems in a downflow black liquor gasification system in accordance with the present invention to avoid excessive load on causticizing systems.

We claim:

1. A process for the preparation of an aqueous solution of alkaline compounds from a generator combustible gas containing carbon monoxide, carbon dioxide, hydrogen and entrained alkaline compounds, wherein said generator combustible gas has been formed during partial combustion of cellulose spent liquors in a gas generator, the process comprising the steps of:

a) transferring said generator combustible gas through a vertically arranged downcomming tube into a quench vessel partially filled with a green liquor, an upper part of said downcomming tube being connected to an opening of said gas generator and a lower part either terminating above the surface of said green liquor or terminating below the surface of said green liquor, said quench vessel having at least one inlet being connected to and opening into said downcoming tube for supplying one or more aqueous cooling and dissolving liquids into said downcoming tube, said aqueous cooling and dissolving liquids being injected into said downcoming tube in an amount to cool said generator combustible gas to a predetermined temperature above the steam saturation temperature at a prevailing pressure in said quench vessel by evaporative cooling of said generator gas to produce a combustible gas comprising superheated steam and alkaline compounds, and wherein when said downcoming tube terminates below a surface of said green liquor said downcoming tube comprises at least one opening allowing said generator combustible gas to pass out from said downcoming tube;

b) separating said alkaline compounds from said combustible gas of step (a) in said quench vessel to thereby form a combustible gas comprising superheated steam and is substantially-free of alkaline compounds; and c) dissolving said alkaline compounds in said green liquor.

2. A process according to claim 1, further comprising the step of contacting said combustible gas of step (b) with one or more aqueous cooling and dissolving liquids to cool said combustible gas comprising superheated steam to about the steam saturation temperature at a prevailing pressure in said quench vessel.

3. A process according to claim 1, wherein said alkaline compounds are separated from the combustible gas of step (c) by gravity or inertial forces by forcing the combustible gas of step (c) to change direction at said lower part of said downcoming tube or at said opening in said downcoming tube.

4. A process according to claim 1, wherein said predetermined temperature is selected such that said alkaline compounds conglomerate into liquid or solid, or semi liquid/solid particles to facilitate separation of the alkaline compounds from the superheated combustible gas.

5. A process according to claim 1, wherein said combustible gas comprising superheated steam of step (a) has a temperature of from about 250° C. to about 650° C.

6. A process according to claim 1, wherein said combustible gas comprising superheated steam of step (a) has a temperature of from about 250° C. to about 500° C.

7. A process according to claim 1, wherein said combustible gas comprising superheated steam of step (a) has a temperature of from about 250° C. to about 400° C.

8. A process according to claim 1, wherein the aqueous cooling and dissolving liquid injected into the downcoming tube comprises a pulp mill effluent and/or a condensate from a countercurrent gas cooling stage arranged in the gas stream downstream of the quench vessel.

9. A process according to claim 1, wherein said aqueous solution of alkaline compounds has a concentration from about 10 grams to about 200 grams of sodium compounds per liter and a concentration of sodium hydrogen carbonate of less than about 40 grams per liter.

10. A process according to claim 1, wherein said green liquor withdrawn from said quench vessel has a concentration of from about 10 grams to about 200 grams of sodium compounds per liter and a concentration of sodium hydrogen carbonate of less than about 40 grams per liter.

11. A process according to claim 1, wherein said gas generator is part of the chemical recovery system in a Kraft pulp mill and said cellulose spent liquor is a spent liquor from said Kraft pulp mill.

12. A process for the preparation of an aqueous solution of alkaline compounds from a generator combustible gas containing carbon monoxide, carbon dioxide, hydrogen and entrained alkaline compounds, wherein said generator combustible gas has been formed during partial combustion of cellulose spent liquors in a gas generator, the process comprising the steps of:

a) transferring said generator combustible gas through a vertically arranged downcomming tube into a quench vessel partially filled with a green liquor, an upper part of said downcomming tube being connected to an opening of said gas generator and a lower part either terminating above the surface of said green liquor or terminating below the surface of said green liquor, said quench vessel having at least one inlet being connected to and opening into said downcoming tube for supplying one or more aqueous cooling and dissolving liquids into said downcoming tube, said aqueous cooling and dissolving liquids being injected into said downcoming tube in an amount to cool said generator combustible gas to a predetermined temperature above the steam saturation temperature at a prevailing pressure in said quench vessel by evaporative cooling of said generator combustible gas to produce a combustible gas comprising superheated steam and alkaline compounds and wherein when said downcoming tube terminates below a surface of said green liquor said downcoming tube comprises at least one opening allowing said generator combustible gas to pass out from said downcoming tube;

b) separating said alkaline compounds from said combustible gas of step (a) in said quench vessel to thereby form a combustible gas comprising superheated steam and is substantially-free of alkaline compounds;

c) dissolving said alkaline compounds in said green liquor; and d) contacting said combustible gas of step (b) with an aqueous cooling and dissolving liquid to cool said gas to about the steam saturation temperature a prevailing pressure.

13. A process according to claim 12, wherein said steam saturation temperature ranges from about 150° C. to about 250° C.

14. A process for the preparation of an aqueous solution of alkaline compounds from a generator combustible gas containing carbon monoxide, carbon dioxide, hydrogen and entrained alkaline compounds, wherein said generator combustible gas has been formed during partial combustion of cellulose spent liquors in a gas generator, the process comprising the steps of:

a) transferring said generator combustible gas through a vertically arranged downcomming tube into a quench vessel partially filled with a green liquor, an upper part of said downcomming tube being connected to an opening of said gas generator and a lower part either terminating above the surface of said green liquor or terminating below the surface of said green liquor, said quench vessel having at least one inlet being connected to and opening into said downcoming tube for supplying one or more aqueous cooling and dissolving liquids into said downcoming tube, said aqueous cooling and dissolving liquids being injected into said downcoming tube in an amount to cool said generator combustible gas to a predetermined temperature above the steam saturation temperature at a prevailing pressure in said quench vessel by evaporative cooling of said, generator combustible gas to produce a combustible gas comprising superheated steam and alkaline compounds, and wherein when said downcoming tube terminates below a surface of said green liquor said downcoming tube comprises at least one opening allowing said generator combustible gas to pass out from said downcoming tube;

b) separating said alkaline compounds from said combustible gas of step (a) in said quench vessel to thereby form a combustible gas comprising superheated steam and is substantially-free of alkaline compounds;

c) dissolving said alkaline compounds in said green liquor; and d) contacting said combustible gas of step (b) with an aqueous cooling and dissolving liquid in said quench vessel to cool said alkaline-free gas to about the steam saturation temperature a prevailing pressure before said combustible gas exits said quench vessel.

15. A process for the preparation of an aqueous solution of alkaline compounds from a generator combustible gas containing carbon monoxide, carbon dioxide, hydrogen and entrained alkaline compounds, wherein said generator combustible gas has been formed during partial combustion of cellulose spent liquors in a gas generator, the process comprising the steps of:

a) contacting said generator combustible gas with one or more aqueous cooling and dissolving liquids under conditions such that said generator combustible gas is cooled to a predetermined temperature above the steam saturation temperature at a prevailing pressure in a quench vessel by evaporative cooling of said generator combustible gas, wherein a gas comprising superheated steam and alkaline compounds is formed;

b) separating said alkaline compounds from said combustible gas of step (a) in a quench vessel to thereby form a combustible gas comprising superheated steam and is substantially-free of alkaline compounds; and c) dissolving said alkaline compounds in an aqueous liquid in said quench vessel to form an aqueous solution of alkaline compounds having a concentration of from about 10 grams to about 200 grams of sodium compounds per liter and a concentration of sodium hydrogen carbonate of less than about 20 grams per liter.

16. A process for the preparation of an aqueous solution of alkaline compounds from a generator combustible gas containing carbon monoxide, carbon dioxide, hydrogen and entrained alkaline compounds, wherein said generator combustible gas has been formed during partial combustion of cellulose spent liquors in a gas generator, the process comprising the steps of:

a) transferring said generator combustible gas through a vertically arranged downcomming tube into a quench vessel partially filled with a green liquor, an upper part of said downcomming tube being connected to an opening of said gas generator and a lower part either terminating above the surface of said green liquor or terminating below the surface of said green liquor, said quench vessel having at least one inlet being connected to and opening into said downcoming tube for supplying one or more aqueous cooling and dissolving liquids into said downcoming tube, said aqueous cooling and dissolving liquids being injected into said downcoming tube in an amount to cool said generator combustible gas to a predetermined temperature above the steam saturation temperature at a prevailing pressure in said quench vessel by evaporative cooling of said generator combustible gas to produce a combustible gas comprising superheated steam and alkaline compounds and wherein when said downcoming tube terminates below a surface of said green liquor said downcoming tube comprises at least one opening allowing said generator combustible gas to pass out from said downcoming tube;

b) separating said alkaline compounds from said combustible gas of step (a) said quench vessel to thereby form a combustible gas comprising superheated steam and is substantially-free of alkaline compounds;

c) dissolving said alkaline compounds in said green liquor;

d) contacting said combustible gas of step (b) with one or more aqueous cooling and dissolving liquids to cool said gas to a temperature of about the steam saturation temperature at a prevailing pressure in said quench vessel; and e) withdrawing said green liquor from said quench vessel having a concentration of from about 10 grams to about 200 grams of sodium compounds per liter and a concentration of sodium hydrogen carbonate of less than about 20 grams per liter.

17. A process for the preparation of a green liquor comprising alkaline compounds that have been separated from a generator combustible gas containing carbon monoxide, carbon dioxide, hydrogen and entrained alkaline compounds, wherein said generator combustible gas has been formed during partial combustion of cellulose spent liquors in a gas generator connected to a quench vessel, the process comprising the steps of:

(a) passing said generator combustible gas through a vertically arranged downcoming tube, wherein said quench vessel is partially filled with a green liquor and said vertically arranged downcoming tube has an upper part being connected to an opening of said gas generator and a lower part either terminating above a surface of said green liquor or terminating below the surface of said green liquor, said quench vessel having at least one inlet being connected to and opening into said downcoming tube for supplying an aqueous cooling and dissolving liquid into said downcoming tube, wherein said generator combustible gas is cooled by evaporation of said aqueous cooling and dissolving liquid whereby a combustible gas comprising superheated steam and alkaline compounds are formed, and wherein said alkaline compounds are separated from said combustible gas comprising superheated steam and dissolved in said green liquor to thereby form a combustible gas comprising superheated steam and which is substantially-free of alkaline compounds, and wherein when said downcoming tube terminates below a surface of said green liquor said downcoming tube comprises at least one opening allowing said generator combustible gas to pass out from said downcoming tube;

(b) injecting said aqueous dissolving liquid into said downcoming tube in an amount sufficient to cool the generator combustible gas to a predetermined temperature higher than the steam saturation temperature at a prevailing pressure in said quench vessel; and (c) contacting said superheated combustible gas of step (a) with at least one aqueous cooling and dissolving liquid to cool said superheated combustible gas to about the steam saturation temperature of said gas at a prevailing pressure.

18. A process according to claim 17, wherein said predetermined temperature is from about 250° C. to about 650° C. and said steam saturation temperature is from about 150° C. to about 250° C.

* * * * *